United States Patent [19]

Mizutori

[11] Patent Number: 5,237,427
[45] Date of Patent: Aug. 17, 1993

[54] FACSIMILE SYSTEM CAPABLE OF MONITORING AN ABNORMALITY IN A FACSIMILE STORAGE AND EXCHANGE DEVICE

[75] Inventor: Youichi Mizutori, Tokyo, Japan

[73] Assignee: Kabushiki Kaisha Toshiba, Kawasaki, Japan

[21] Appl. No.: 572,353

[22] Filed: Aug. 27, 1990

Related U.S. Application Data

[63] Continuation of Ser. No. 259,671, Oct. 19, 1988, abandoned.

[30] Foreign Application Priority Data

Oct. 19, 1987 [JP] Japan .................................. 62-261701

[51] Int. Cl.$^5$ .................................................. H04N 1/00
[52] U.S. Cl. ...................................... 358/406; 358/400; 358/434
[58] Field of Search ............... 358/405, 406, 400, 403, 358/434, 437, 441; 371/9.1

[56] References Cited

U.S. PATENT DOCUMENTS

| | | | |
|---|---|---|---|
| 4,549,219 | 10/1985 | Sue et al. | 358/286 |
| 4,591,921 | 5/1986 | Nakajima | 358/257 |
| 4,610,013 | 9/1986 | Long et al. | 371/9.1 |

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

A facsimile system comprising a facsimile storage and exchange device for temporarily storing an image signal received together with destination data, and for transmitting the image signal in accordance with the destination data. The facsimile storage and exchange device also includes an abnormality detecting unit for detecting an abnormality occurring therein and a failure reporting unit which transmits, as an image signal, data on an abnormality, if any, detected by the abnormality detecting unit to a monitoring facsimile unit provided separately from the facsimile storage and exchange device.

5 Claims, 10 Drawing Sheets

```
% %-ABEND- 00011    %00    TASK IS ENDED ABNORMALLY
% TASK IDENTIFIER   %01, TASK NAME %2
% END CODE %03, END AUXILIARY DATA %04, %05, %06, %07, %08
% PSW %09, LOCATION %10, USER IDENTIFIER %11
% LOAD MODULE NAME %12
```

FACSIMILE SYSTEM CAPABLE OF MONITORING AN ABNORMALITY IN A FACSIMILE STORAGE AND EXCHANGE DEVICE

This application is a continuation of application Ser. No. 259,671, filed Oct. 19, 1988, now abandoned.

BACKGROUND OF THE INVENTION

1. Field of the Invention

This invention relates to facsimile systems including a facsimile storage and exchange device and, more particularly, to facsimile systems capable of monitoring an abnormality in a facsimile storage and exchange device from a distance.

2. Description of the Related Art

Figure 1:
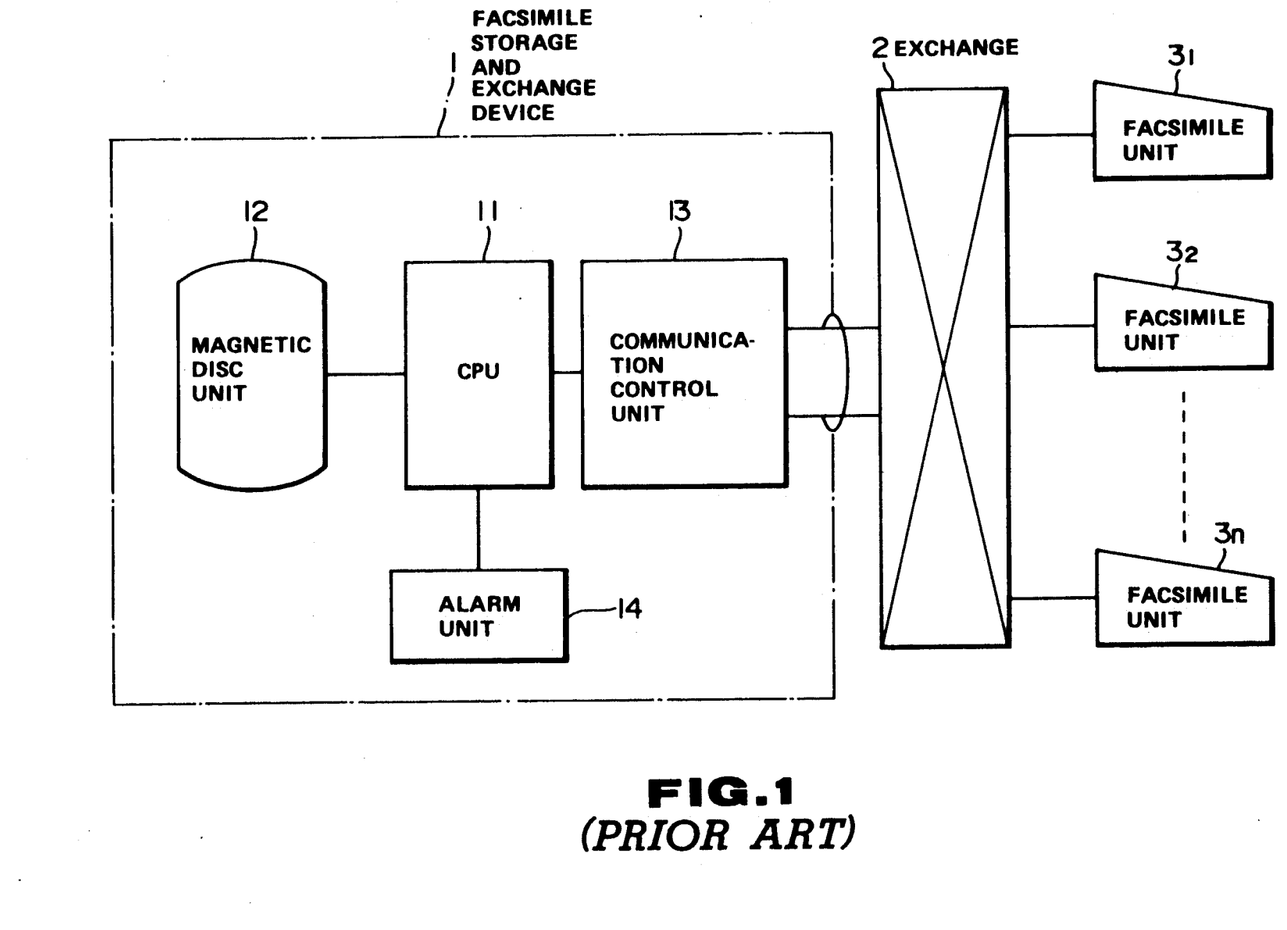
FIG. 1 is a block diagram of a conventional facsimile system.

A conventional facsimile system comprising a facsimile storage and exchange device has a structure shown in FIG. 1. An exchange 2 is connected to a facsimile storage and exchange device 1 and facsimile units $3l$-$3n$ through corresponding lines. The exchange device 1 includes a CPU 11 which control the operation of the components of the system, a magnetic disc unit 12 used for storage of received image signals or the like, a communication control unit 13 for control of the operation of a network and communication, and an alarm unit 14 which alerts the operator to an abnormality in the facsimile storage and exchange device 1. CPU 11 has a function to detect abnormalities of programs therein, the lines, the hardware, etc., and delivers information on the detected abnormalities to the alarm unit 14 which alerts the operator to the abnormalities by means of a display or an alarm sound. The facsimile storage and exchange device 1 is considered as one unit, the alarm unit 14 is provided as a peripheral terminal of CPU 11 in the facsimile exchange device 1. An operator such as a maintenance person is not always present all the time in the vicinity of the facsimile exchange device 1. When the operator is at a place remote from the exchange device 1, it is impossible to inform the operator of the occurrence of an abnormality in the exchange device 1 to thereby cause him to take necessary measures. Thus such system is inconvenient.

The present invention is intended to solve such problem in the conventional facsimile systems including a conventional facsimile storage and exchange device. It is an object of the present invention to provide a facsimile system which is capable of recognizing an abnormality in the exchange device from a distance and therefore is very convenient from a standpoint of maintenance.

SUMMARY OF THE INVENTION

According to the present invention, there is provided a facsimile system comprising a facsimile storage and exchange device for temporarily storing an image signal received together with destination data, and for transmitting the image signal in accordance with the destination data; a monitoring facsimile unit capable of communicating with the facsimile storage and exchange device via a line; means provided in the facsimile storage and exchange device for detecting an abnormality in the facsimile storage and exchange device; and abnormality information transmitting means provided in the facsimile storage and exchange device for transmitting to the monitoring facsimile unit, as an image signal, data on the abnormality detected by the abnormality detecting means.

According to such structure, when an abnormality occurs in the facsimile storage and exchange device, it is detected and the information on such abnormality is delivered as the image signal to the monitoring facsimile unit. The monitoring facsimile unit records and outputs the information on the abnormality so that the abnormality information may be recognized.

According to the present invention, information on abnormalities is delivered to a facsimile unit connected to the facsimile storage and exchange device via a line, so that remote monitoring is possible conveniently.

DESCRIPTION OF THE PREFERRED EMBODIMENT

Figure 2:
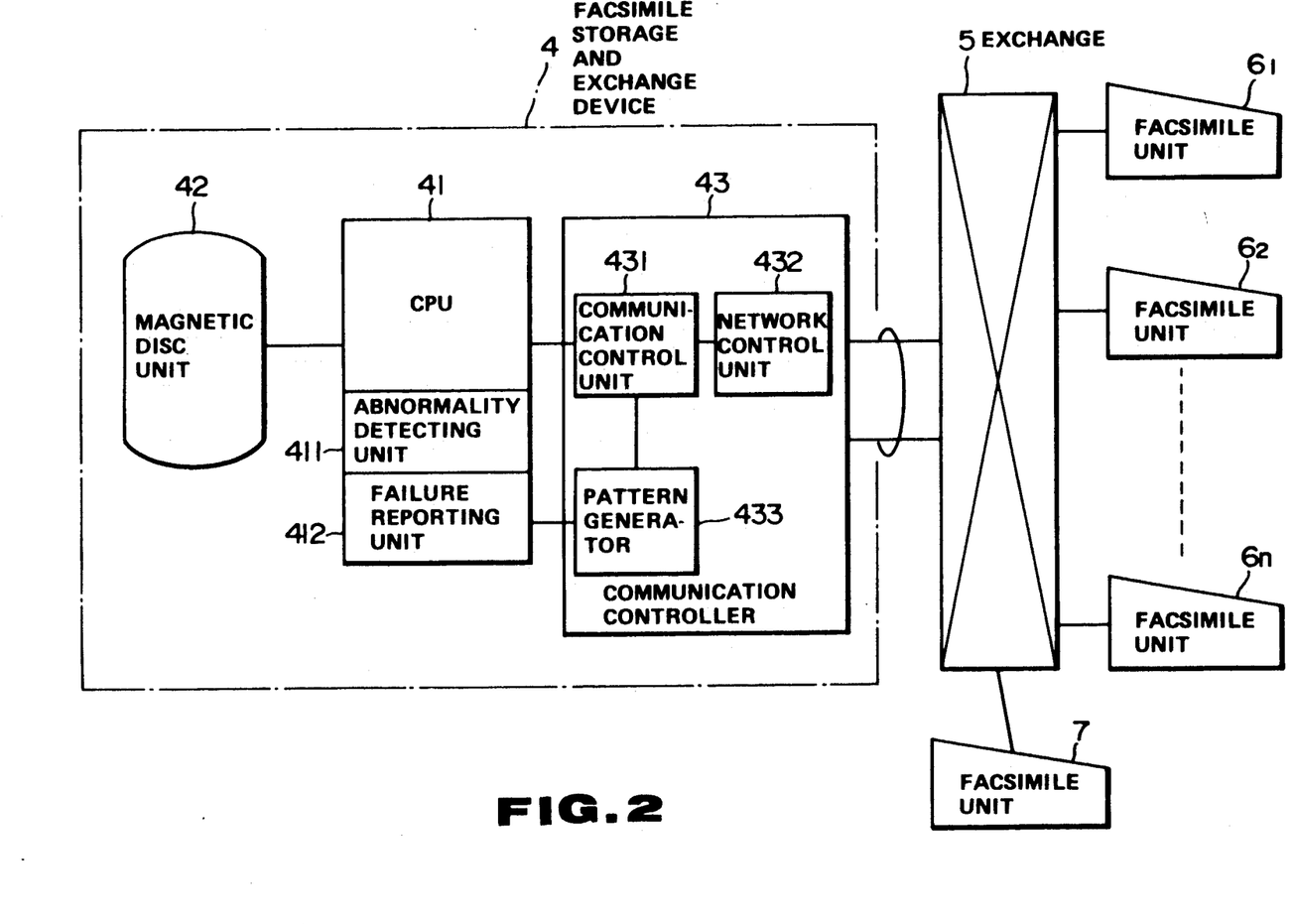
FIG. 2 is a block diagram of one embodiment of the present invention.

One embodiment of the present invention will now be described with reference to the drawings. FIG. 2 is a block diagram of one embodiment of the present invention in which reference numerals 4 and 5 denote a facsimile storage and exchange device and an exchange, respectively. Reference numerals $6l$-$6n$ denote corresponding facsimile units. Reference numeral 7 denotes a monitoring facsimile unit. The facsimile units $6l$-$6n$, 7 and the facsimile exchange device 4 are capable of communication through the lines and exchange 5. The facsimile storage and exchange device 4 includes a central processing unit (CPU) 41, a magnetic disc unit 42, a communication controller 43. The communication controller 43 includes a communication control unit 431 which transmits and receives control signals in accordance with transmission control procedures, a network control unit 432 which starts and restores a network, and a pattern generator 433 which generates a pattern signal in accordance with a character code. CPU 41 includes an abnormality detecting unit 411 which detects an abnormality in CPU 41 and a failure reporting unit 412. When an abnormality detecting unit 411 detects the occurrence of an abnormality, the failure reporting unit 412 outputs to the pattern generator 433 information representing what the abnormality is, where the abnormality has occurred, what program has been executed at the time, what status the system is in at that time, etc., as character codes arranged on a message having a predetermined format. The facsimile storage and exchange device 4 has a plurality of channels through which it can communicate with the plurality of facsimile units simultaneously. Even if an abnormality occurs in some of the channels, the exchange device 4 can basically communicate with the facsimile unit 7 using a normal one of the channels. The failure reporting unit 412 and the pattern generator 433 function as abnormality information transferring means.

Figure 3:
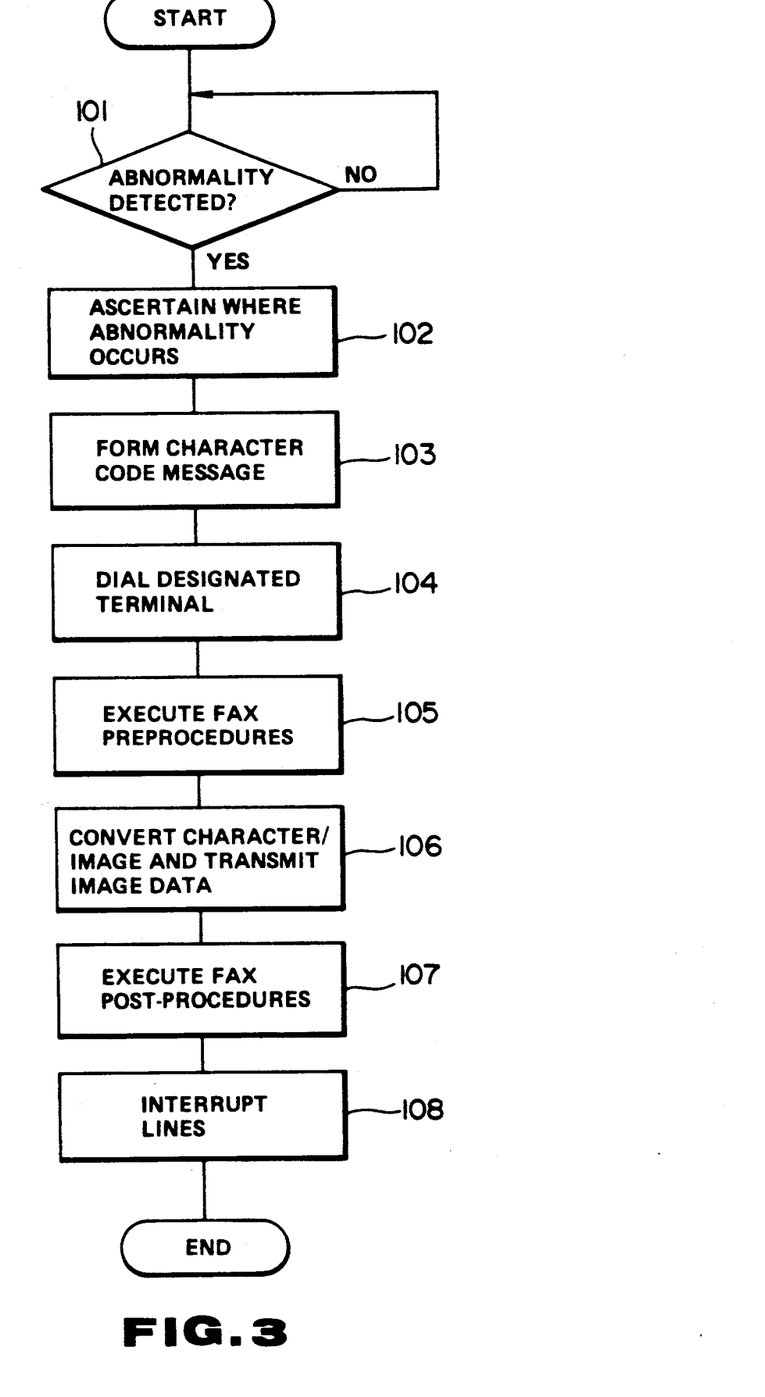
FIG. 3 is a flowchart for explaining the operation of the embodiment of the present invention.

The operation of the system having such structure will now be described with reference to the flowchart of FIG. 3. First, when the facsimile storage and exchange device 4 is started, CPU 41 functions as abnormality detecting unit 411 to check the presence of an abnormality (step 101). When an abnormality is detected, CPU 41 ascertains whether the abnormality has occurred (step 102) and collects necessary information on the abnormality. CPU 41 then functions as the failure reporting unit 412 and creates a message on the abnormality information in character codes (step 103). CPU 41 then controls the network controller 432 and dials a designated terminal or the facsimile unit 7 for calling purposes (step 104). When the facsimile unit 7 responds, CPU 41 controls the communication control unit 431 such that same transmits to an receives from the facsimile unit 7 control signals as preprocedures for facsimile transmission (step 105). CPU 41 then delivers the character codes as an image signal to the pattern generator 433 to cause same to transmit the image signal to the failure reporting unit 412 (step 106). When th transmission of the image signal has ended, CPU 41 controls the communication control unit 431 to cause same to transmit and receive a control signals in accordance with the post-procedures for the facsimile transmission (step 107) and finally interrupts the lines (step 108).

As a result, the abnormality information is sent to, recorded and output by the facsimile unit 7. Since the facsimile unit 7 is connected to the facsimile storage and exchange device 4 via a line, it may be installed at a place remote from the facsimile storage and exchange device 4. Therefore, it is preferred for remote supervision. Since the facsimile storage and exchange device can trace and transmit as abnormality information the program sections executed when the abnormality has occurred, it is convenient for analysis of the causes of the abnormality.

Figure 4:
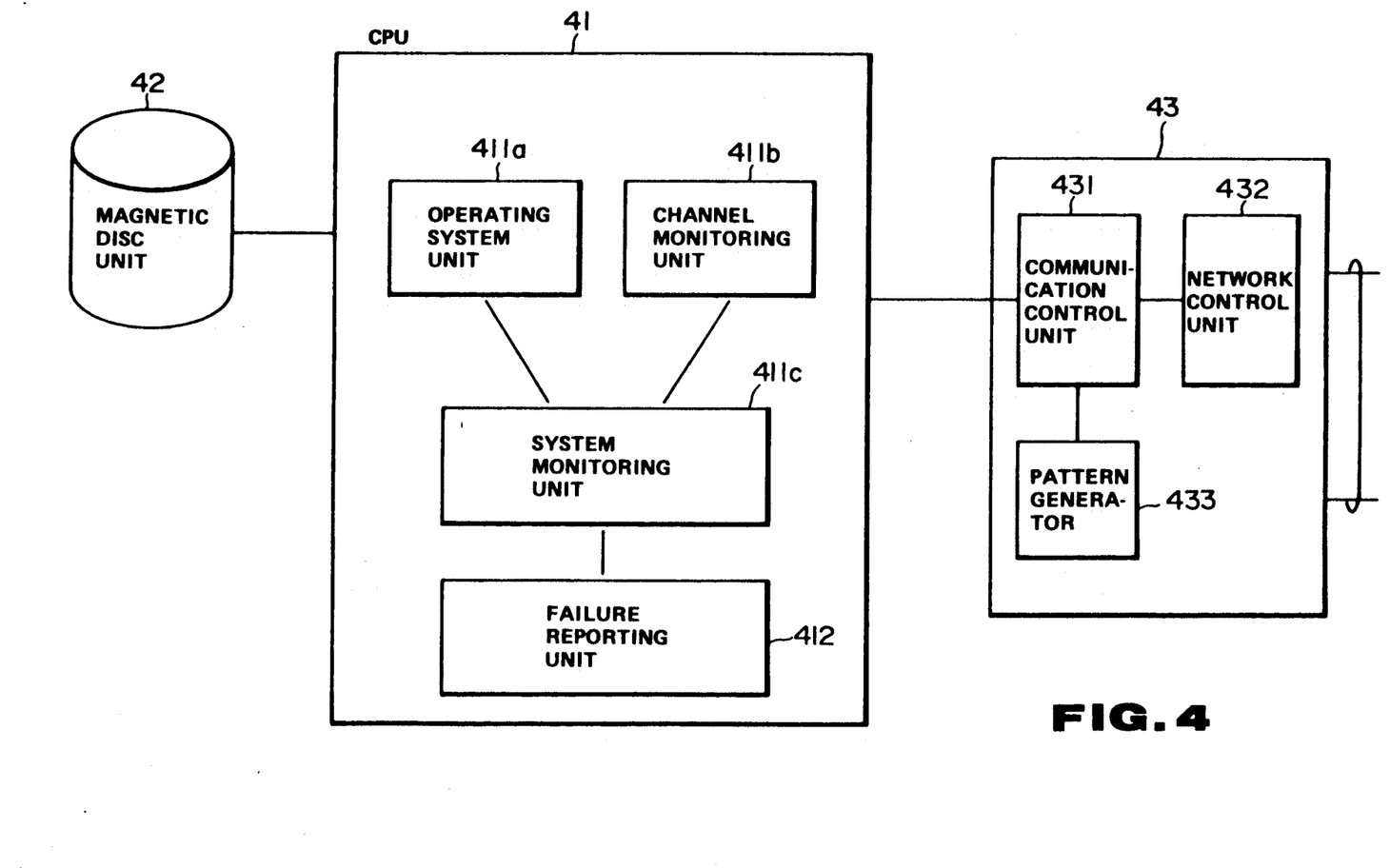
FIG. 4 is a detailed block diagram of the abnormality detecting unit.
Figure 5:
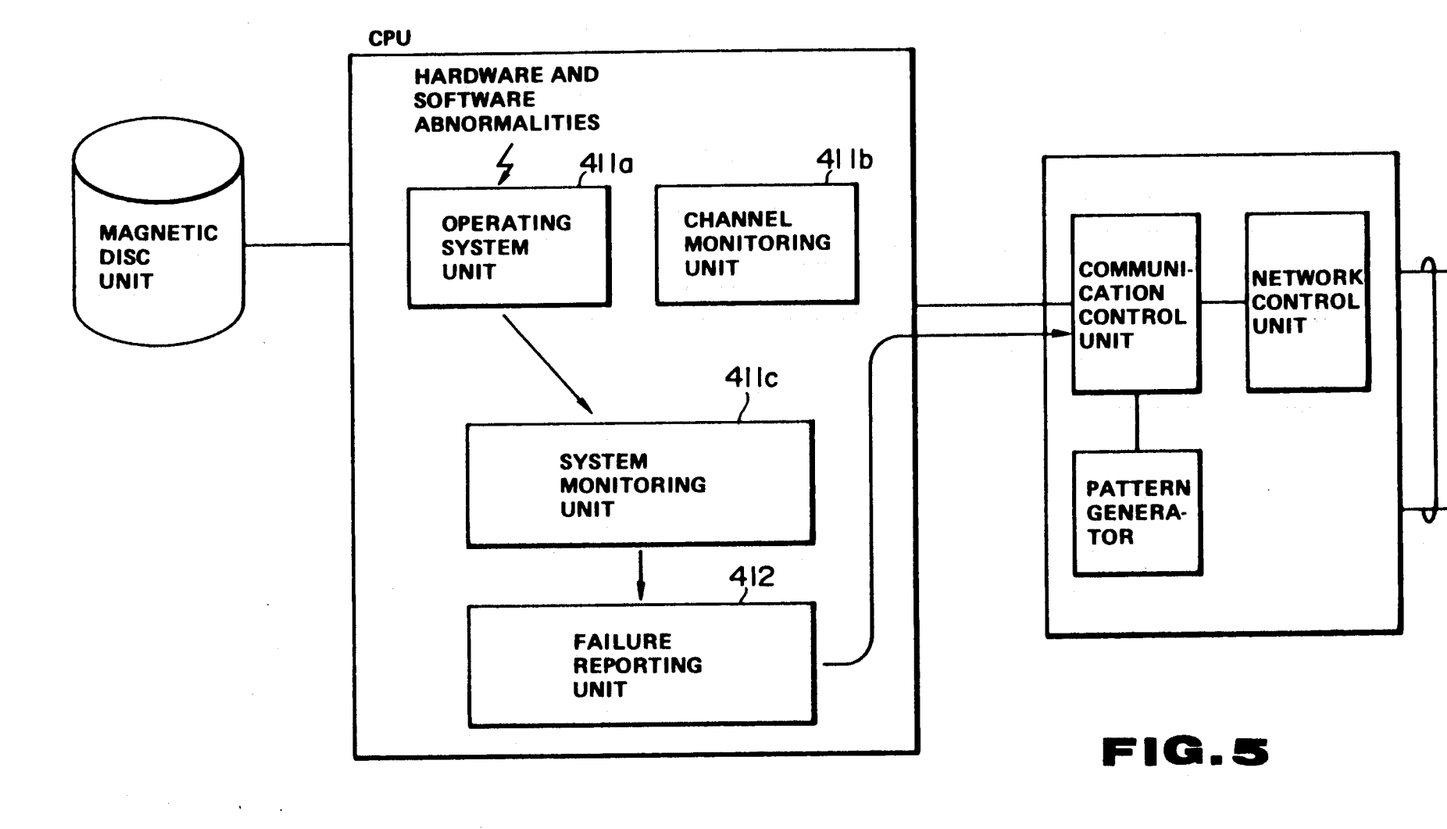
FIG. 5 is a flow of the procedures executed for detection of an abnormality using an operational system.

FIG. 4 illustrates detailedly the CPU 41 of FIG. 2 which functions as the abnormality detecting unit. In this case, CPU 41 functions as an operating system (OS) unit 411a, a channel monitoring unit 411b, a system monitoring unit 411c, and a failure reporting unit 412,.. In such arrangement, OS unit 411a detects abnormalities in CPU 41, the hardware of the magnetic disc unit 42, and the software (for example, when a program has ended abnormally). FIG. 5 illustrates a flow of the procedures executed when OS unit 411a detects abnormalities in CPU 41, the hardware of magnetic disc 42 and/or the software. In FIG. 5, when OS unit 411a detects those abnormalities, it informs the system monitoring unit 411c of the detected contents.

The system monitoring unit 411c monitors the whole system and manages all information on abnormalities occurring in the system. In this case, the system monitoring unit 411c extracts information to be reported from the information reported by the OS unit 411a and informs the failure reporting unit 412 of this information.

Figure 6:
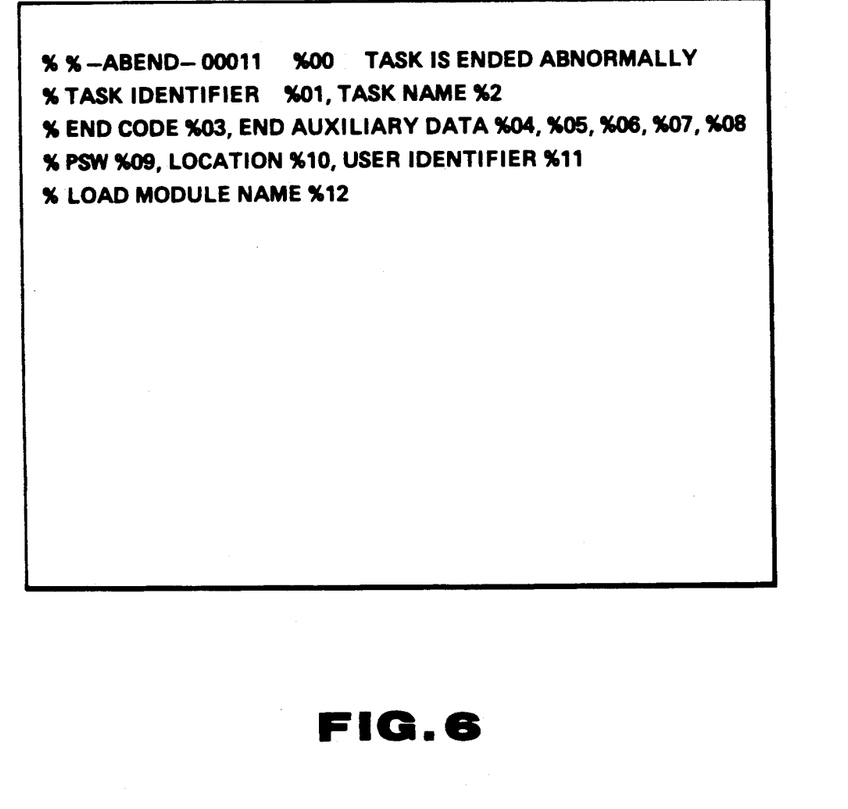
FIG. 6 illustrates one example of a message showing an abnormality in the software.

In accordance with reported information, the failure reporting unit 412 forms a message in accordance with the contents of the reported information. The message comprises character codes. The information on the edited character codes is transmitted to a designated facsimile terminal. After the character information is transferred to the communication control unit 431 of the communication controller 43, it is again transmitted to the destination facsimile terminal via the communication control unit 431 and the network controller 432. FIG. 6 illustrates one example of a message formed when an abnormality occurs at the software.

Figure 7:
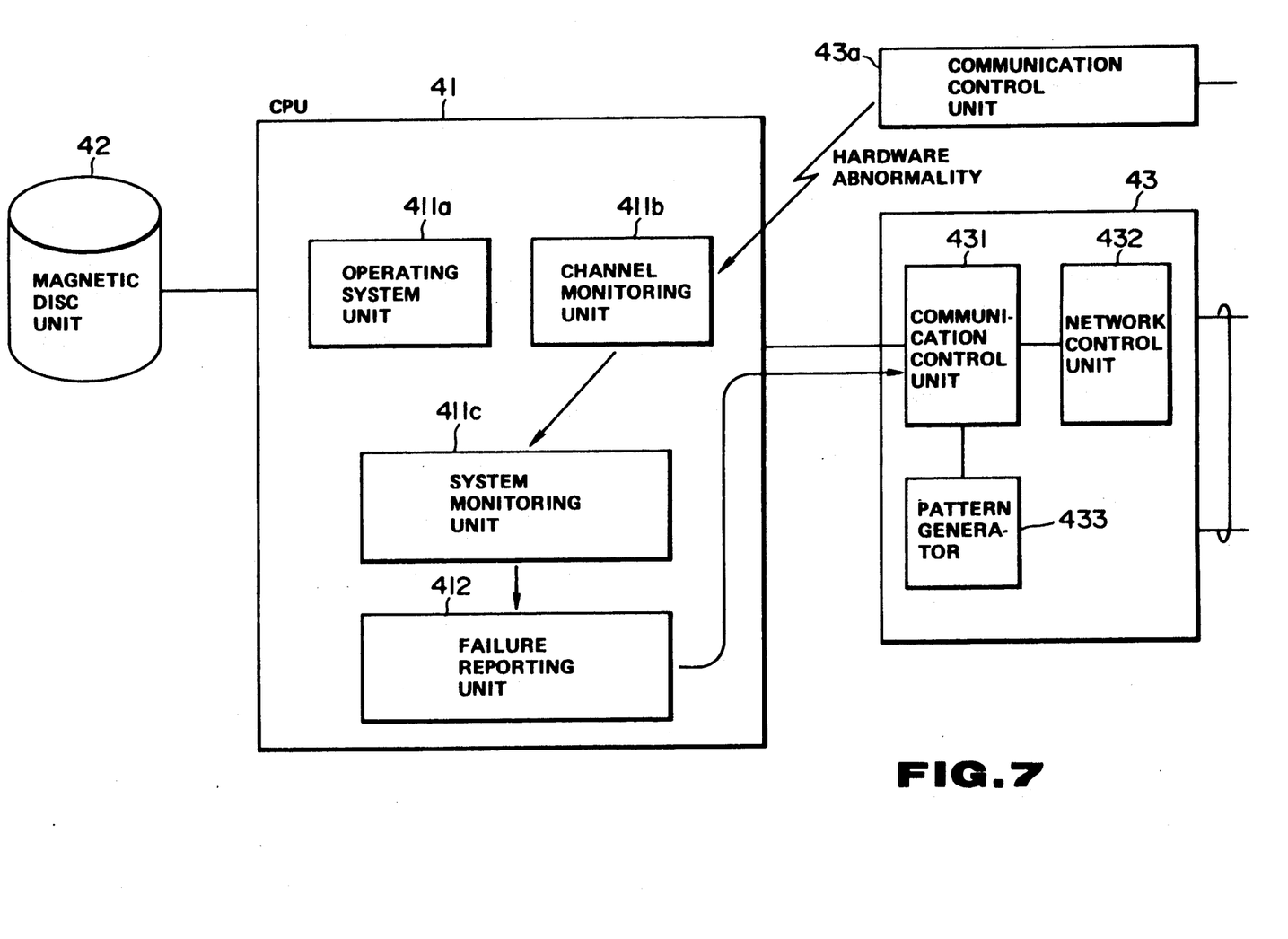
FIG. 7 is a flow of the procedures effected when an abnormality occurs in the hardware.

The channel monitoring unit 411b detects an abnormality in the hardware of the communication controllers 43, communication control unit 43a, as shown in FIG. 7 and the communications channels.

Figure 8:
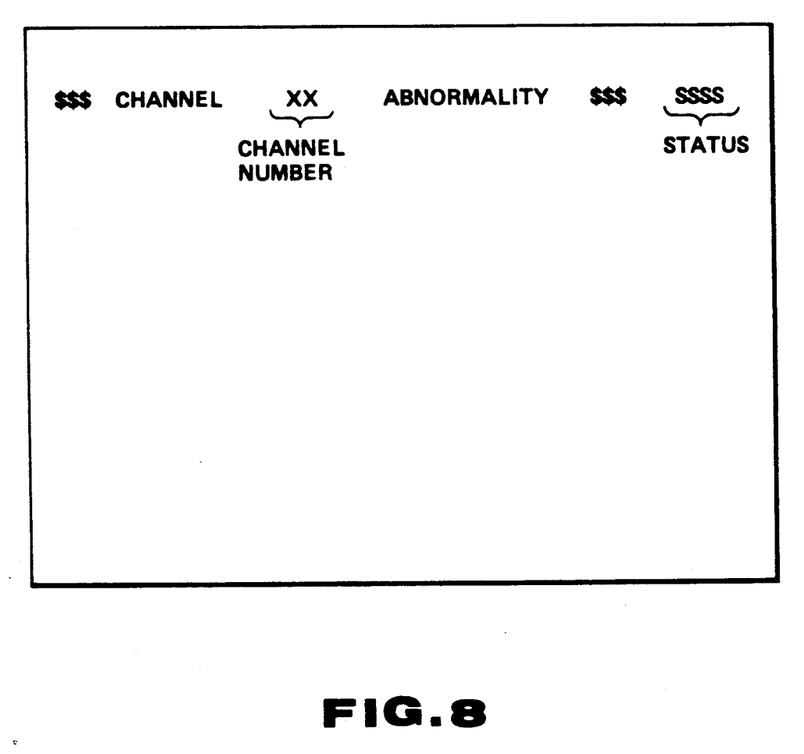
FIG. 8 illustrates one example of a message showing an abnormality in the channel.

FIG. 7 shows a flow of the procedures performed when an abnormality occurs in the hardware of the communication controller 43a. The channel monitoring unit 411b recognizes the contents of the status of the system (the response signal from the communication controller 43a) when CPU 41 has accessed the communication controller 43a. When abnormalities in the hardware are detected, the communication controller 43a informs the channel monitoring unit 411b of that fact as status information. The channel monitoring unit 411b receives such information, it informs the system monitoring unit 411c of the information. The system monitoring unit 411c in turn informs the failure reporting unit 412 of that information. The failure reporting unit 412 edits the received information to form a message. FIG. 8 shows one example of a message formed when the hardware abnormality includes a channel abnormality.

Figure 9:
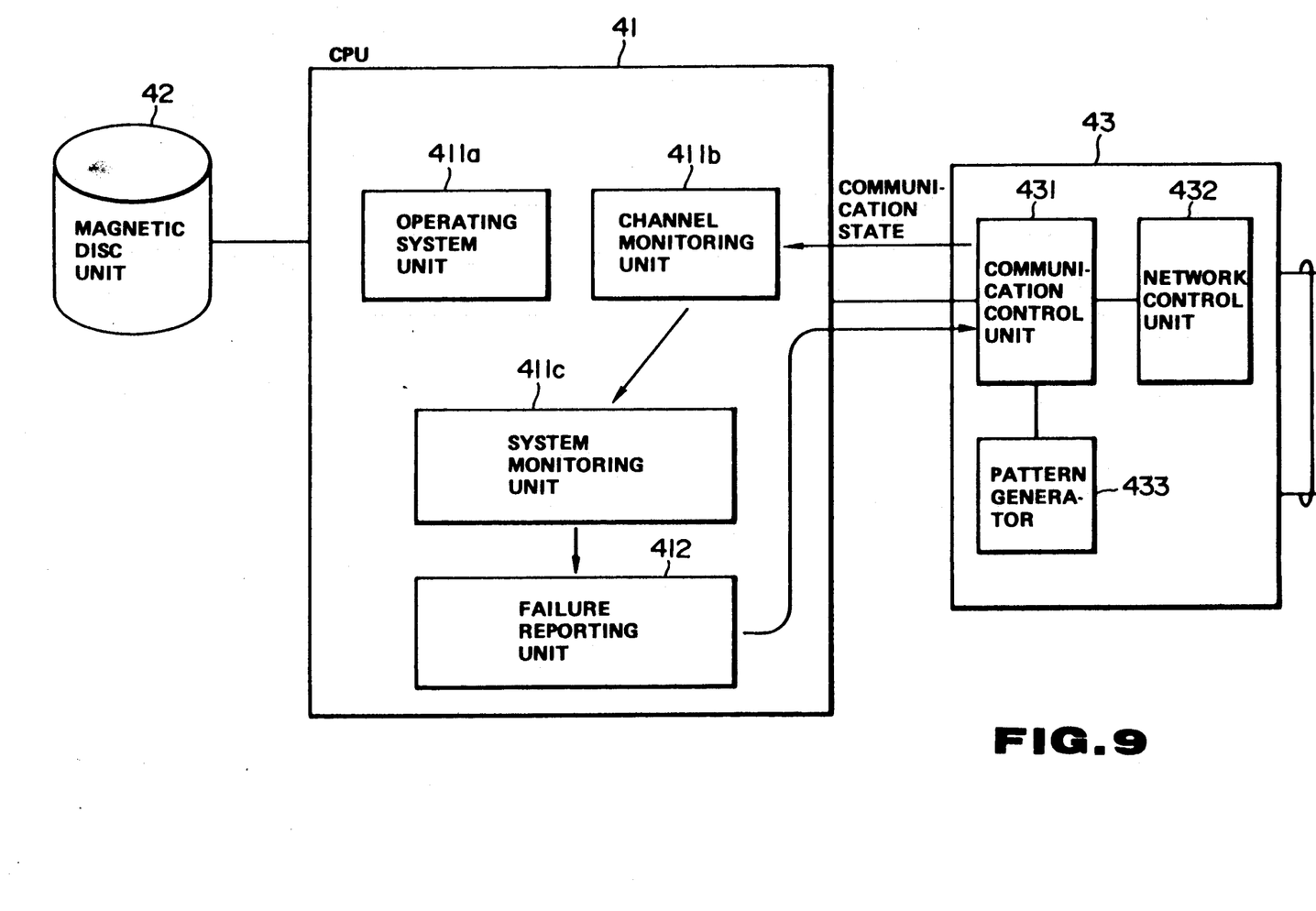
FIG. 9 is a flow of the procedures for detecting abnormalities from the communication state.

FIG. 9 shows a flow of the procedures executed for detecting abnormalities from the communication state. In order to detect abnormalities from the communication state, there are two methods, one for detecting the communication state using the communication controller 43 and the other for determining an abnormality on the CPU 41 side. In the former case, the communication controller 43 monitors the communication state to detect no good condition of the line, whether a terminal unit at the other end of a particular line is abnormal or not, etc. In the latter case, CPU 41 totals the communication results of the communication controller 43 to determine whether the lines are in a bad condition and whether a terminal at the end of a particular line is abnormal, etc. For example, when a line is interrupted, the communication controller 43 can only detect that connection is impossible. Namely, it can not discriminate between that the terminal at the other of the particular line is busy and that the line is interrupted. If a connection failure occurs frequently at the same communication controller 43, CPU 41 can determine that the line is faulty. CPU 41 can also recognize the state of the terminal at other end of a particular line by synthetically judging the communication results from a plurality of communication control units 43.

Figure 10:
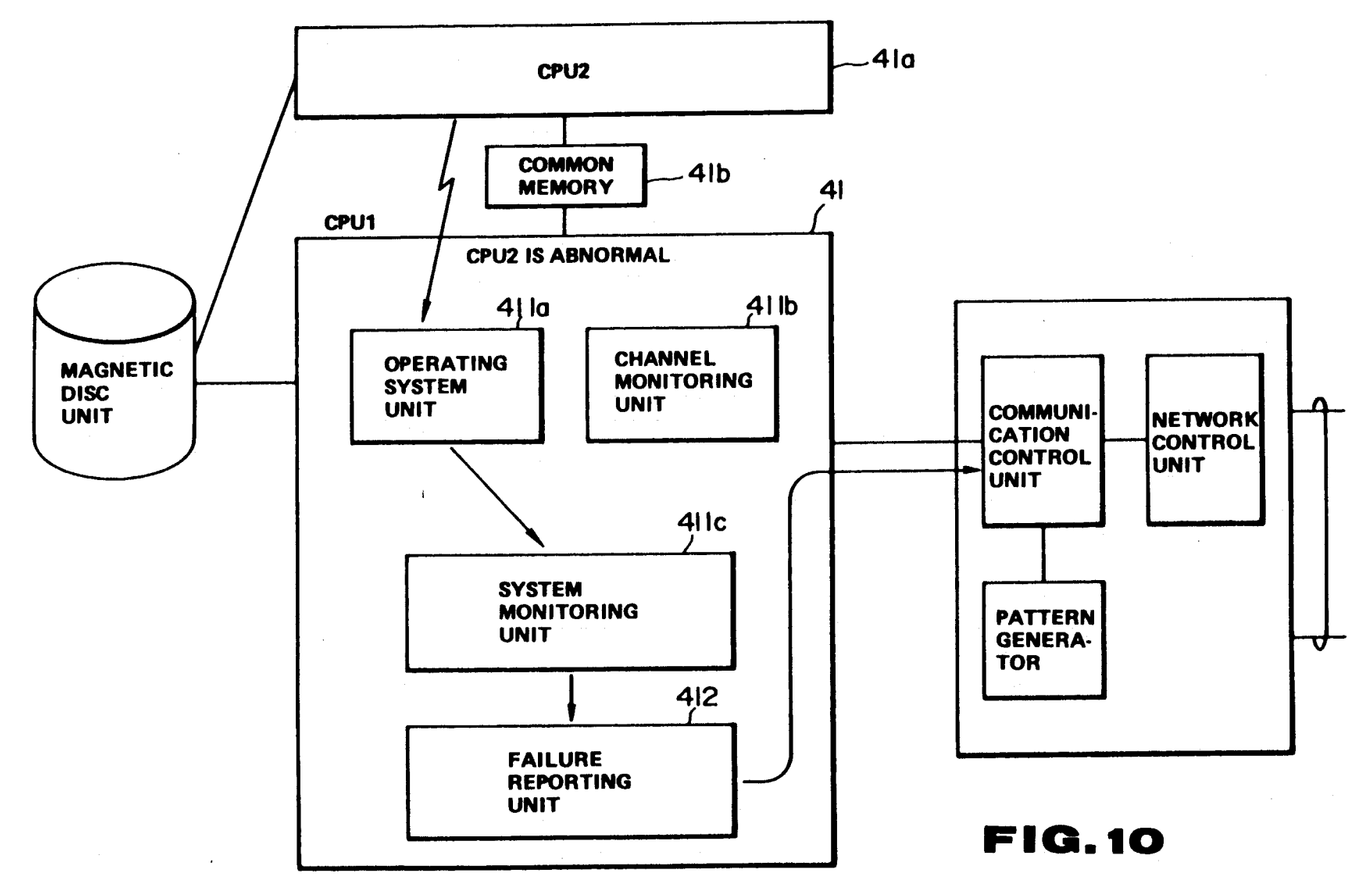
FIG. 10 is a block diagram of another embodiment using a plurality of CPUs.

There is a chance in which CPU 41 itself can stop depending on the scale of hardware and/or software abnormalities. In this case, even if an abnormality may be detected, the failure reporting means does not work. FIG. 10 shows another embodiment of the present invention in which the failure can be reported even in such a case. In the embodiment of FIG. 10, CPU 41a similar in structure to CPU 41 is connected to a common memory 41b which stores the operating data such as destination data and status data of each CPU. In the arrangement, when CPU 41a stops, OS unit 411a can detect the stoppage of CPU 41a via the common memory 41b. Thereafter, the failure reporting is performed using procedures similar to those described with reference to FIG. 5.

The detected abnormalities can be classified, for example, into hardware failures, software failures and circuit failures. It is possible to select a destination to which a message is sent in accordance with a classified failure. For example, arrangement may be such that hardware failures are reported automatically to a hardware maintenance section, for example, the facsimile unit 7, and software failures are reported to a software maintenance section, for example, the facsimile unit 9n.

What is claimed is:

1. A facsimile system, comprising:
   facsimile storage and exchange means having a plurality of communication channels, coupled to a plurality of facsimile devices, for temporarily storing an image signal and destination data from a respective one of the facsimile devices, and for transmitting the stored image signal to one or more of the facsimile devices in accordance with the destination data through one or more of the communication channels, one of said facsimile devices being a monitoring device remotely detached from said facsimile storage and exchange means, the monitoring device including a plurality of monitoring stations, each responsive to a respective type of abnormality, said facsimile storage and exchange means including:
   means for detecting abnormalities in said facsimile storage and exchange means, the abnormality detecting means including means for detecting data regarding the cause and location of the detected abnormality;
   means, coupled to said detecting means, for forming an abnormality image signal representing a detected abnormality, the forming means including means for organizing said detected abnormality data and for forming an image signal in accordance with the organized data, the forming means also including means for classifying the detected abnormalities into a plurality of classes, each class being defined as one of the types of abnormalities, and means for forming a plurality of image signals each corresponding to one of the classes, each signal including the abnormality information for the respective class;
   means for selecting a normal one of said communication channels; and
   means for automatically sending said abnormality image signal to said monitoring device through a selected normal communication channel, the sending means including means for transmitting an abnormality image signal representing a respective type of abnormality to a respective one of the monitoring stations.

2. The facsimile system according to claim 1, wherein the abnormality detecting means includes mean for detecting an abnormality in software in the facsimile storage and exchange means.

3. The facsimile system according to claim 1, wherein the abnormality detecting means includes means for detecting an abnormality in hardware in the facsimile storage and exchange means.

4. The facsimile system according to claim 1, wherein the abnormality detecting means includes means for detecting an abnormality in said communication channels.

5. The facsimile system according to claim 1, wherein the abnormality detecting means includes means for detecting abnormalities in software and hardware in the facsimile storage and exchange means, and in the communication channels.

* * * * *